(12) United States Patent
Shao

(10) Patent No.: US 7,661,354 B2
(45) Date of Patent: Feb. 16, 2010

(54) KETTLE FOR BEVERAGE, ELECTRIC WATER KETTLE AND CABLELESS ELECTRIC KETTLE FOR BEVERAGE

(76) Inventor: Zhicheng Shao, Yongheng Thermostat Co., Chencun Town, Jiangtou Jiangbei Industry District, Shunde, Guangdong (CN) 5283214

( * ) Notice: Subject to any disclaimer, the term of this patent is extended or adjusted under 35 U.S.C. 154(b) by 557 days.

(21) Appl. No.: 10/599,054

(22) PCT Filed: Mar. 21, 2005

(86) PCT No.: PCT/CN2005/000357

§ 371 (c)(1),
(2), (4) Date: Sep. 18, 2006

(87) PCT Pub. No.: WO2005/102124

PCT Pub. Date: Nov. 3, 2005

(65) Prior Publication Data

US 2007/0169629 A1      Jul. 26, 2007

(30) Foreign Application Priority Data

Apr. 19, 2004   (CN) ................... 2004 1 0026884

(51) Int. Cl.
*A47J 31/047* (2006.01)
(52) U.S. Cl. .................. 99/303; 99/281; 99/280
(58) Field of Classification Search .......... 99/303, 99/293, 280, 281, 282, 283
See application file for complete search history.

(56) References Cited

U.S. PATENT DOCUMENTS

| | | | | | |
|---|---|---|---|---|---|
| 95,959 | A | * | 10/1869 | Warner | 99/303 |
| 168,327 | A | * | 10/1875 | Dewald | 99/303 |
| 1,774,927 | A | * | 9/1930 | Lambert | 99/303 |
| 3,044,388 | A | * | 7/1962 | Lescure | 99/285 |
| 3,368,476 | A | * | 2/1968 | Mancioli | 99/293 |

(Continued)

FOREIGN PATENT DOCUMENTS

CN            1483374            3/2004

*Primary Examiner*—Reginald L Alexander
(74) *Attorney, Agent, or Firm*—Global IP Services; Tianhua Gu

(57) ABSTRACT

This invention is in technical field of electric heating, and relates to a kind of kettles for beverage, electric water kettles and cableless electric kettles for beverage. Its aim is to solve the problem appearing at existing kettles for beverage, i.e. Vapor and water generated in existing kettles for beverage flies out through top port of funnel. This may not only go through the lid of inner vessel, but also reach onto the lid of kettle body. As result, inner side of the lid of kettle body would be with tea or coffee stains, and its surface will be very hot to make its use difficult and there is sanitary problem due to contamination on surface of the lid. Kettles of this invention contain an inner vessel fixed on bottom of the kettle body inside the kettle. A funnel is provided at top opening of the inner vessel. There are two separate filtering layers inside the funnel: an upper and a lower filtering layer. On the inner vessel, there is a cap covering the opening of the kettle body and having a pipe from cavity of inner vessel to space between kettle body and inner vessel. Kettles of this invention are easy to use, and avoids accidental touch of the funnel with high temperature. It may prevent from burned as well as contamination due to touch of inner part of the kettle body.

22 Claims, 4 Drawing Sheets

U.S. PATENT DOCUMENTS

| | | | |
|---|---|---|---|
| 4,098,176 A * | 7/1978 | Perez | 99/303 |
| 5,067,396 A | 11/1991 | Sorensen | |
| 6,062,127 A * | 5/2000 | Klosinski et al. | 99/303 |
| 6,578,467 B1 * | 6/2003 | Taylor et al. | 99/281 |

* cited by examiner

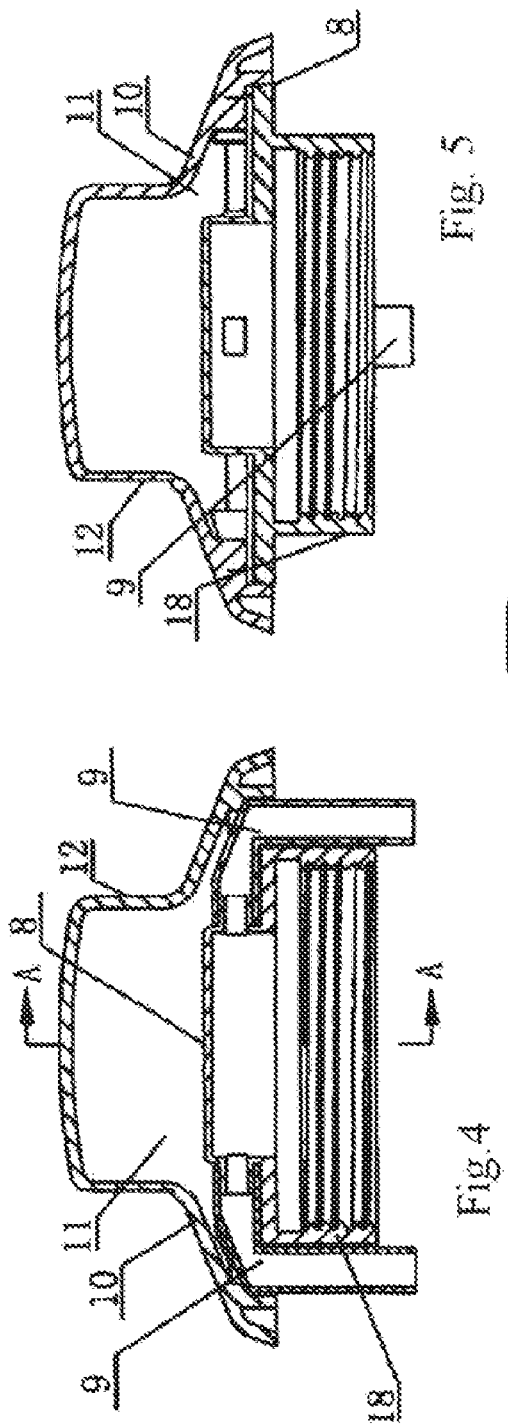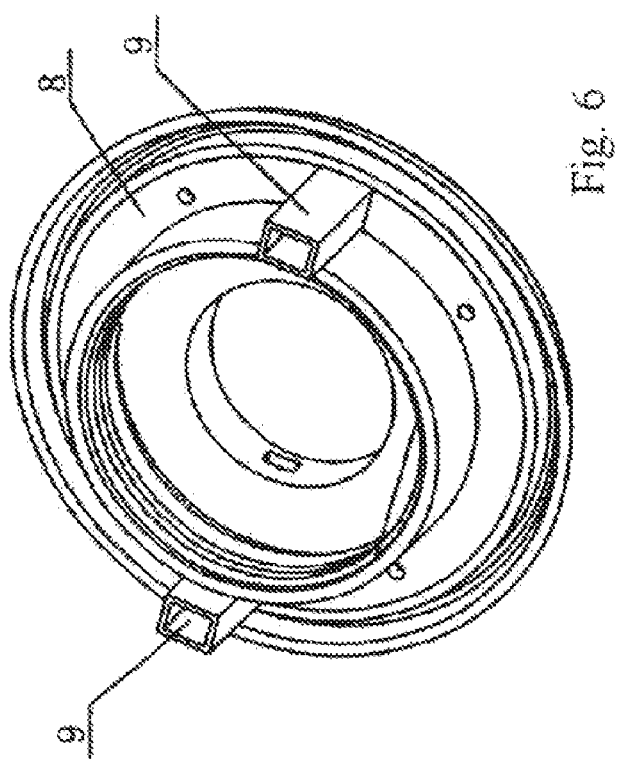

KETTLE FOR BEVERAGE, ELECTRIC WATER KETTLE AND CABLELESS ELECTRIC KETTLE FOR BEVERAGE

FIELD OF THE INVENTION

This invention relates to a kind of kettles for beverage, electric water kettles and cableless electric kettles for beverage.

BACKGROUND OF THE INVENTION

Chinese patent no. 031268358 titled kettle for beverage, electric water kettle and cableless electric water kettle disclosed a kind of kettles for beverage. Such kettles have inner vessel on bottom of its kettle body, a funnel is provided at top opening of its inner vessel, and the funnel contains two separate filtering layers: upper filtering layer and lower filtering layer. Such upper filtering layer is set up on a lid covering top opening of the inner vessel. On operation, the kettle is heated from its bottom side. Boiling water in the inner vessel flies out through upper and lower filtering layers from lower port of the funnel. With tealeaf or coffee powder placed between these two filtering layers, this water will become delicious tea or coffee. Its shortcoming is as follows: there is a lid on top of inner vessel covering the inner vessel only, while there is also a lid on top of kettle body. When water in the inner vessel is boiling, vapor and water generated in inner vessel flies out through top port of the funnel. This may not only go through the lid of inner vessel, but also reach onto the lid of kettle body. In case of tea or coffee, inner side of the lid of kettle body would be full with tea or coffee stain, and its surface will be very hot to make it difficult to open the lid of kettle body as well as the lid of inner vessel. In addition, it is necessary to open two lids, which brings inconvenient for the operation. Besides, when opening lid of inner vessel, the user will touch the outer surface of the lid and contaminate it. Therefore, sanitary problem may arise too.

SUMMARY OF THE INVENTION

First aim of this invention is to provide a kind of kettles for beverage that is easy to open its lid without contamination.

Second aim of this invention is to provide a kind of electric kettles for beverage that is easy to open its lid without contamination.

Third aim of this invention is to provide a kind of cableless electric kettles for beverage that is easy to open its lid without contamination.

In order to realize the first aim of this invention, the kettle for beverage contains a kettle body, in which there is on its bottom an inner vessel provided with a funnel at its upper opening, the funnel contains two separate filtering layers: upper filtering layer and lower filtering layer, a cap is on said inner vessel, the cap covers the opening of the kettle body too, a pipe connects the cavity of the inner vessel with the space between the kettle body and inner vessel.

In order to realize the second aim of this invention, the electric kettle for beverage contains an electric heater. In the kettle body an inner vessel is provided on its bottom attached the electric heater, a funnel is provided on the upper opening of the inner vessel, the funnel contains two separate filtering layers: upper filtering layer and lower filtering layer. A cap is on said inner vessel, the cap covers the opening of kettle body too. A pipe connects the cavity of the inner vessel with the space between said kettle body and inner vessel.

In order to realize the third aim of this invention, the cableless electric kettle for beverage contains an electric heater, a kettle body and a base. The kettle body is placed on the base; first electric connector in connection with electric heater and second electric connector in connection with main power are set up on the kettle body or base. On bottom of the kettle body there is an inner vessel provided with a funnel on its upper opening, the funnel contains two separate filtering layers: upper filtering layer and lower filtering layer, a cap is on said inner vessel, the cap covers the opening of kettle body too, a pipe connects the cavity of the inner vessel with the space between said kettle body and inner vessel.

Since there is a lid set up on inner vessel and covers the opening of kettle body, the lid is equipped with pipe connecting the cavity of inner vessel with the space between kettle body and inner vessel, boiling water in the inner vessel may go through lower port of the funnel and fly out from top port of the funnel, then enters through the pipe into space between the kettle body and inner vessel. When adding tea-leaf or coffee powder into the funnel, users need not touch the top end of the funnel, simply by holding edge of the lid to open the lid, the operation is convenient, avoids touching the funnel with high temperature, so that the new kettle prevents from heat injury and sanitary problem of contamination.

BRIEF DESCRIPTION OF THE DRAWINGS

FIG. 4 is structural diagram of the lid of the kettles shown in FIG. 1, FIG. 2 and FIG. 3.

FIG. 5 is section view of line a-a shown in FIG. 4

FIG. 6 is 3-d structural diagram of the lid of the kettles shown in FIG. 1, FIG. 2 and FIG. 3.

DETAILED DESCRIPTION OF THE PREFERRED EMBODIMENTS

Figure 1:
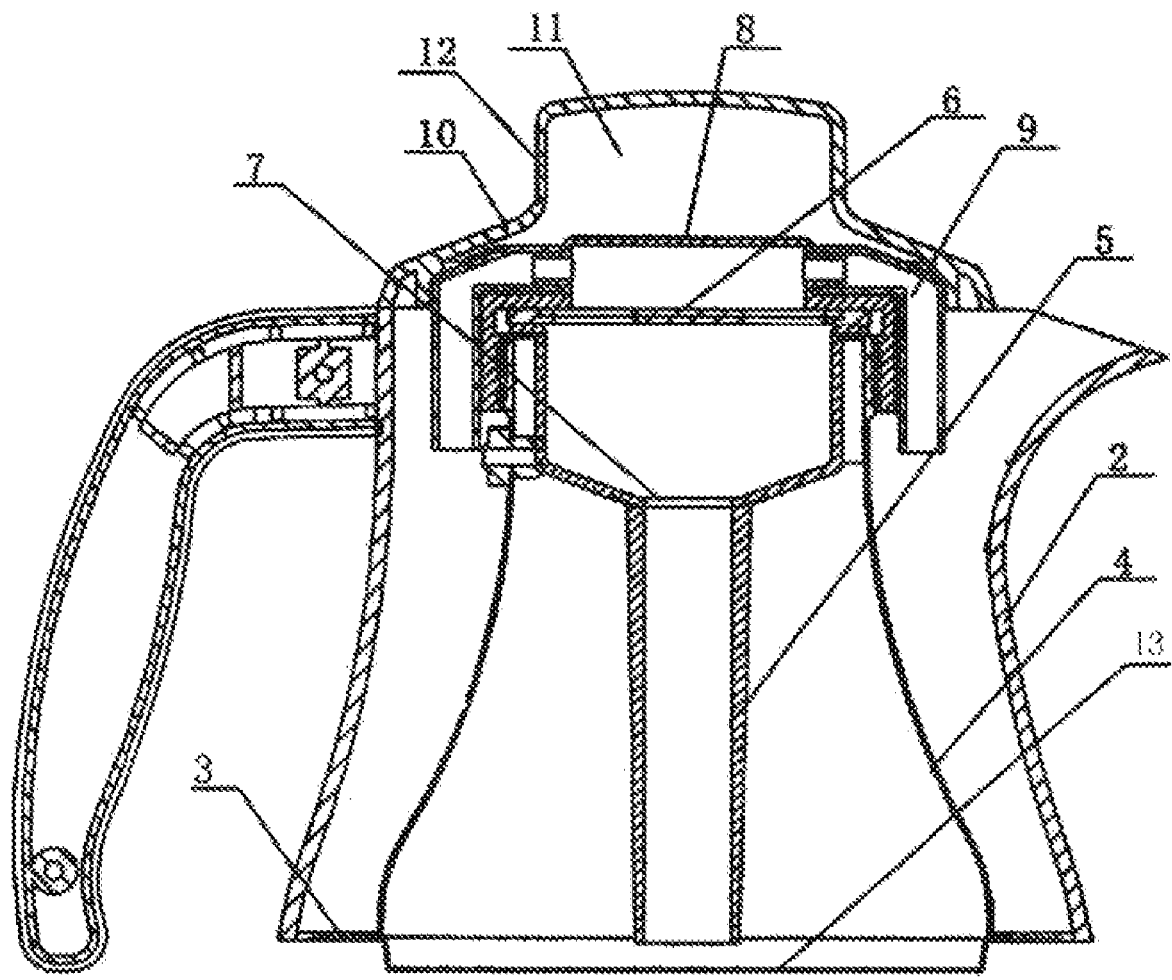
FIG. 1 is structural diagram of the kettle for beverage in this invention

As shown in FIG. 1, FIG. 4, FIG. 5 and FIG. 6, the kettle for beverage in this invention contains a kettle body 2, a bottom 3 of kettle body, an inner vessel 4, a funnel 5, an upper filtering layer 6, a lower filtering layer 7, a cap 8, a pipe 9, an isolation cavity 11, a surface layer 10, a lid handle 12 and a bottom 13 of inner vessel.

The kettle body 2 may be made of metal such as stainless steel, as well as of plastic material. The bottom 3 of kettle body is made of metal, which is possible to be heated on heat source such as stoves. Plastic kettle body is easy to be formed to the required shape. Said cap 8 has a surface possible to cover the top opening of kettle body 2, and the surface is provided with annular edge 18, which extends downwards and is possible to cover on the upper opening of inner vessel 4, threads are provided on both annular edge 18 and inner vessel 4 for their connection so that the cap 8 may be fixed and connected it onto the upper port of inner vessel 4 by rotating. Said pipe 9 is a bended pipe in shape of 1, its one end connects with sidewall of concave cavity inside cap 8, another end extends downwards into the cavity of the kettle body 2. Said cap 8 is provided with surface layer 10 covering on pipe 9 and to form a isolation cavity 11 together with pipe 9. Since there is water and vapor flowing through pipe 9 during its working, the surface of the pipe would be in high temperature, this isolation cavity 11 would isolate heat and the high temperature to make the temperature on the surface layer 10 to be significantly lower, so that no part of surface layer 10 would cause heat injury in case of the user accidentally touches it. The surface layer 10 is provided with a lid handle 12 on it to facilitate to hold the cap 8. The inner vessel 4 may be made of metal or metal plus plastics. The bottom 13 of inner vessel must be made of metal so that it can be heated regardless the inner vessel 4 may be made of plastics. The coincident part of the bottom 13 of inner vessel and the kettle bottom 3 of kettle body 2 extends downwards to form a depressed surface, so that it can be heated focally by the heat source; the part of the bottom that is not coincident with the bottom of inner vessel should extends upwards and away from heat source as far as possible. This will help to enhance heating efficiency as well as to reduce surface temperature of kettle body 2 because it is not heated directly. The bottom 13 of inner vessel is made of metal plate with good magnetic conductivity. If iron plate is used, the kettle for beverage may be heated on both electromagnetic stoves as well as ordinary stoves. This is convenient for its use.

As shown in FIG. 2, FIG. 4, FIG. 5 and FIG. 6, the electric kettle for beverage in this invention contains an electric heater 1, a kettle body 2, a bottom 3 of kettle body, an inner vessel 4, a funnel 5, an upper filtering layer 6, a lower filtering layer 7, a cap 8, a pipe 9, a surface layer 10, an isolation cavity 11, a lid handle 12, a bottom 13 of inner vessel and a temperature controller 14 for dry boiling protection.

The structures and relative relation in location for the kettle body 2, bottom 3 of kettle body, inner vessel 4, funnel 5, upper filtering layer 6, lower filtering layer 7, cap 8 and pipe 9 are the same as the above-mentioned kettle for beverage.

The electric heater 1 is set up on bottom 13 of the inner vessel 4. When electric heater 1 is powered, its generated heat is focused on bottom 13 of the inner vessel. In case the water in the inner vessel 4 is boiling and exhausted, the temperature of bottom 13 of the inner vessel will be increased because of lack of water, but the entire kettle body would not be damaged by overheating, because water still exists in part of outer edge of bottom 3 of kettle body. Only the temperature of inner vessel 4 would be exceeding, but there is water around it.

Temperature controller 14 for dry boiling protection is set on the bottom 13 of inner vessel. In case water in inner vessel 4 is boiling and exhausted, the temperature of bottom 13 of inner vessel will be increased fast because of lack of water, and temperature controller 14 detects this fast increase in temperature and operates to cut off the power supply to electric heater 1. When water in inner vessel 4 is still existed, the temperature of inner vessel 4 is generally not higher than 100° C., and after water in it is exhausted, its temperature would exceed 100° C. It is necessary to select a temperature controller with appropriate operating temperature for dry boiling protection.

Coincident part of the bottom 13 of inner vessel and the bottom 3 of kettle body 2 extends downwards and forms a depressed surface. A temperature controller 14 for dry boiling protection is set on the depressed surface. It enables heat generated by electric heater 1 to be focused on bottom 13 of inner vessel and reduces heat emitted to peripheral part (bottom 3 of kettle body), and also keeps kettle body 2 in lower temperature. In case water in inner vessel 4 is exhausted, the temperature controller 14 detects the temperature change directly and takes its operation quickly.

As shown in the FIG. 3, FIG. 4, FIG. 5 and FIG. 6, the cableless electric kettle for beverage in this invention contains an electric heater 1, a kettle body 2, a bottom 3 of kettle body, an inner vessel 4, a funnel 5, an upper filtering layer 6, a lower filtering a layer 7, a cap 8, a pipe 9, a surface layer 10, an isolation cavity 11, a lid handle 12, a bottom 13 of inner vessel, a temperature controller 14 for dry boiling protection, a base 15, a first electric connector 16 and a second electric connector 17.

Figure 2:
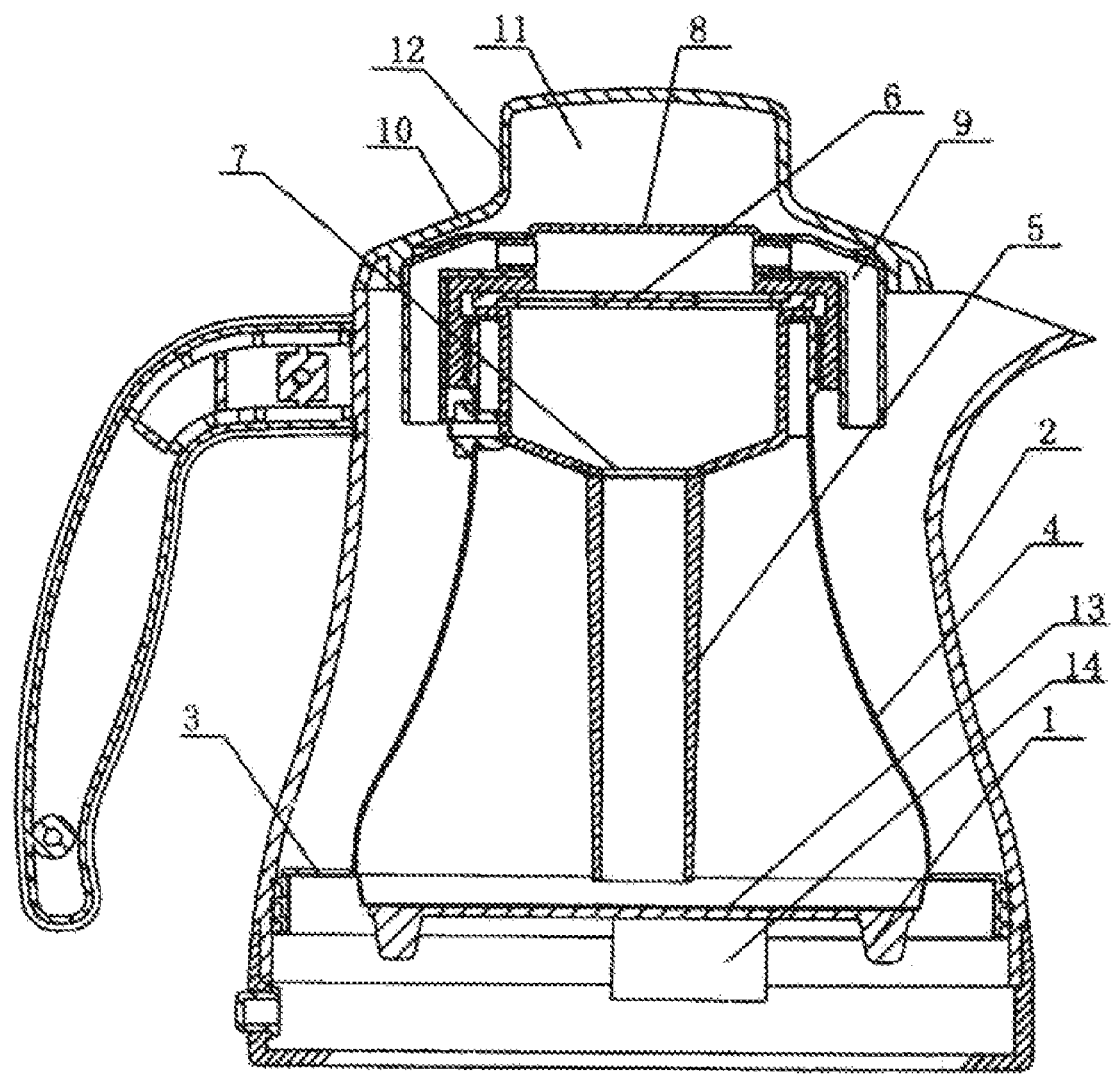
FIG. 2 is structural diagram of the electric kettle for beverage in this invention.
Figure 3:
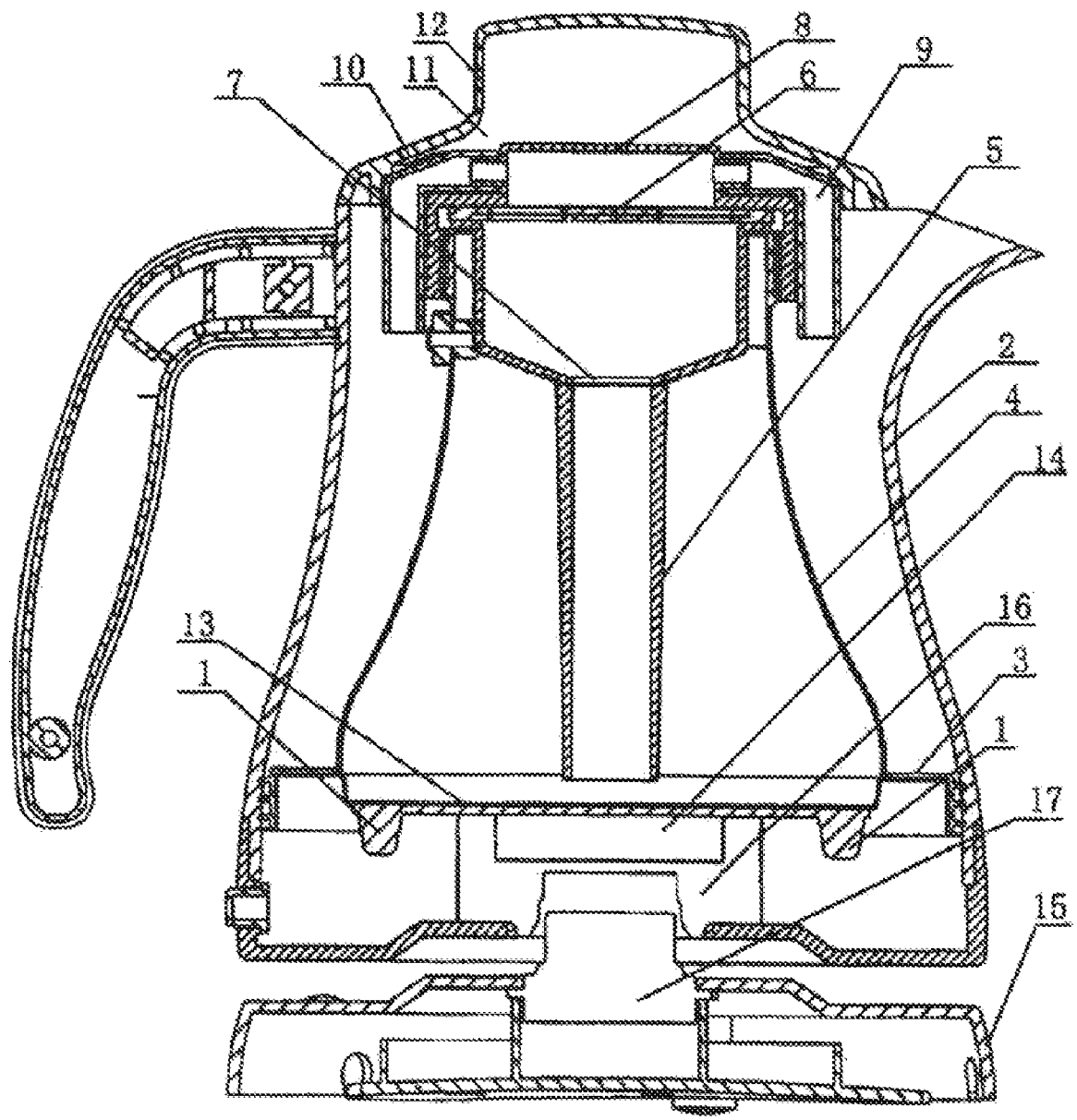
FIG. 3 is structural diagram of the cableless electric kettle for beverage in this invention.

Compared with electric kettle for beverage shown in FIG. 2, the cableless electric kettle for beverage in this invention is basically the same as it except the adding of a base 15, a first electric connector 16 and a second electric connector 17. When using, simply place kettle body 2 on the base 15, and make first electric connector 16 and second electric connector 17 connected together. The electric heater 1 is powered and generates heat. Once the kettle body 2 is separate from the base 15, the electric heater 1 would be disconnected from power supply and no heat is generated.

The present invention improves the structural designs of the lid, the bottom of kettle body and bottom of inner vessel, reduces the temperature of the lid to facilitate opening it, and reduces the liquid stain on inner surface of the lid to facilitate cleaning and washing. The improvement also prevents water and vapor flying out from the opening of kettle body and brings safety to users.

What is claimed is:

1. A kind of kettles for beverage, comprising:
  a kettle body with an opening and a bottom;
  an inner vessel having an upper opening and a bottom being one part of the bottom of the kettle body, a funnel being provided on the upper opening of the inner vessel;
  an upper filtering layer and a lower filtering layer being set up in the funnel;
  a cap being on the inner vessel, covering the opening of the kettle body and having a bended pipe from a cavity of the inner vessel to a space between the kettle body and the inner vessel for preventing hot beverage to flow out of the kettle body.

2. The kettles for beverage of claim 1, wherein said cap is provided with an annular edge extending downwards threads are provided on said annular edge and said inner vessel for their connection.

3. The kettles for beverage of claim 1 or claim 2, wherein said cap is provided with a surface layer covering on said pipe and forming an isolation cavity together with said pipe.

4. The kettles for beverage of claim 3, wherein said surface layer is equipped with a lid handle.

5. The kettles for beverage of claim 1 or claim 2, wherein the coincident part of the bottom of said inner vessel and the bottom of said kettle body extends downwards and forms a depressed surface.

6. The kettles for beverage of claim 1 or claim 2, wherein the bottom of said inner vessel is of a metal plate with good magnetic conductivity.

7. A kind of electric kettles for beverage, comprising:
  a kettle body having an opening, a bottom and an electric heater;
  an inner vessel having an upper opening and a bottom being one part of the bottom of the kettle body, a funnel being provided at the upper opening of the inner vessel;
  an upper filtering layer and a lower filtering layer, being set up in the funnel;
  a cap being on the inner vessel, covering the opening of said kettle body and having a bended pipe from the cavity of said inner vessel to the space between said kettle body and said inner vessel for preventing hot beverage to flow out of the kettle body.

8. The electric kettles for beverage of claim 7, wherein said cap is provided with an annular edge extending downwards, threads are provided on said annular edge and inner vessel for their connection.

9. The electric kettles for beverage of claim 7 or claim 8, wherein said cap is provided with a surface layer covering on said pipe and forming an isolation cavity together with said pipe.

10. The electric kettles for beverage of claim 9, wherein said surface layer is equipped with a lid handle.

11. The electric kettles for beverage of claim 7 or claim 8, wherein said electric heater is set up on the bottom of said inner vessel.

12. The electric kettles for beverage of claim 11, wherein a temperature controller for dry boiling protection being set up on the bottom of said inner vessel.

13. The electric kettles for beverage of claim 7 or claim 8, wherein the coincident part of the bottom of said inner vessel and the bottom of said kettle body extends downwards and forms a depressed surface.

14. The electric kettles for beverage of claim 13, wherein a temperature controller for dry boiling protection being set up on said depressed surface.

15. A kind of cableless electric kettles for beverage comprising an electric heater, a kettle body and a base, said kettle body having a opening and a bottom, which is placed on said base;
   a first electric connector for connection with said electric heater and a second electric connector for connection with main power being set up on said kettle body and said base;
   an inner vessel having a upper opening and a bottom being one part of the bottom of said kettle body, a funnel being provided on the upper opening of said inner vessel;
   an upper filtering layer and a lower filtering layer, being set up in the funnel;
   a cap being on said inner vessel, covering the opening of said kettle body and a bended pipe connecting the cavity of said inner vessel with the space between said kettle body and said inner vessel.

16. The cableless electric kettles for beverage of claim 15, wherein said cap is provided with an annular edge extending downwards, threads are provided on said annular edge and said inner vessel both for their connection.

17. The cableless electric kettles for beverage of claim 15 or claim 16, wherein said cap is provided with a surface layer covering on said pipe and forming a isolation cavity together with said pipe.

18. The cableless electric kettles for beverage of claim 17, wherein said surface layer is equipped with a lid handle.

19. The cableless electric kettles for beverage of claim 15 or claim 16, wherein said electric heater is set up on the bottom of said inner vessel.

20. The cableless electric kettles for beverage of claim 19, wherein a temperature controller for dry boiling protection being set up on the bottom of said inner vessel.

21. The cableless electric kettles for beverage of claim 15 or claim 16, wherein the coincident part of the bottom of said inner vessel and the bottom of said kettle body extends downwards to form a depressed surface.

22. The cableless electric kettles for beverage of claim 21, wherein a temperature controller for dry boiling protection being set up on said depressed surface.

* * * * *